United States Patent [19]

Bryant

[11] 4,267,972

[45] May 19, 1981

[54] PNEUMATICALLY OPERATED GATED IRRIGATION SYSTEM

[75] Inventor: Donald E. Bryant, Larned, Kans.

[73] Assignee: FarmTronics Inc., Larned, Kans.

[21] Appl. No.: 85,588

[22] Filed: Oct. 17, 1979

[51] Int. Cl.³ .................. A01G 25/02; F16K 3/00; F16K 31/12
[52] U.S. Cl. .................. 239/66; 137/869; 239/438; 239/536; 239/563; 239/578; 251/145
[58] Field of Search ............... 239/66, 266, 438, 456, 239/536, 551, 562, 563, 569, 578; 251/31, 145, 146; 137/624.18, 627, 628, 869

[56] References Cited

U.S. PATENT DOCUMENTS

| 201,986 | 4/1878 | Bishop | 239/562 X |
|---|---|---|---|
| 3,037,245 | 6/1962 | Darnell | 251/63 X |
| 3,099,395 | 7/1963 | Petersen | 239/562 |
| 3,212,719 | 10/1965 | Corpo | 239/541 |
| 3,219,273 | 11/1965 | Killen | 239/562 X |
| 3,226,078 | 12/1965 | Anderson | 251/62 |
| 3,342,420 | 9/1967 | Roulet et al. | 239/563 |
| 3,476,358 | 11/1969 | Westerlund et al. | 251/214 |
| 4,014,510 | 3/1977 | Smith | 251/63 |

*Primary Examiner*—Andres Kashnikow
*Attorney, Agent, or Firm*—D. A. N. Chase; Michael Yakimo, Jr.

[57] ABSTRACT

A gated irrigation pipe is operated by a pneumatic control system which automatically opens and closes the gates. Each gate is slidable along the pipe surface and is coupled to a pair of parallel air conduits extending longitudinally along the pipe. The conduits are connected midway between their ends to a common movable pneumatic cylinder which receives therein a piston fixed to the exterior of the pipe. The conduits communicate with opposite ends of the cylinder, and serve as both an air line to the cylinder and an operating linkage which opens and closes the gates and which will not cause damage to the gates in response to differentials of expansion and contraction. A plurality of pipes thus equipped are serially connected to form an irrigation pipeline and the air conduits are interconnected at the pipe joints by flexible hose couplings which may be preset any time during each watering interval. The conduits are pressurized at the end of each interval to change the gates in accordance with a sequential irrigation plan without the necessity of the operator being present to manually open and close the gates.

21 Claims, 13 Drawing Figures

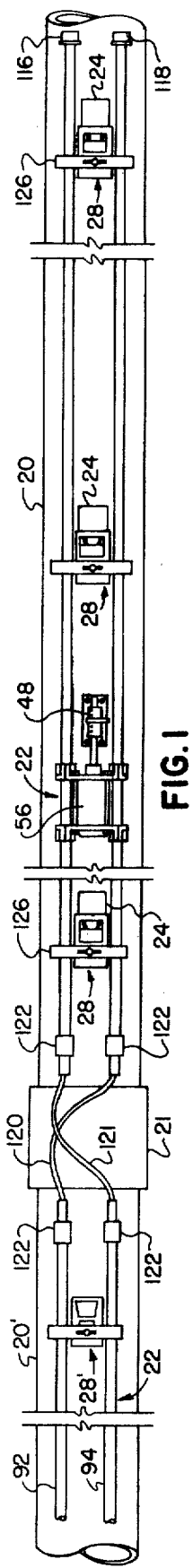
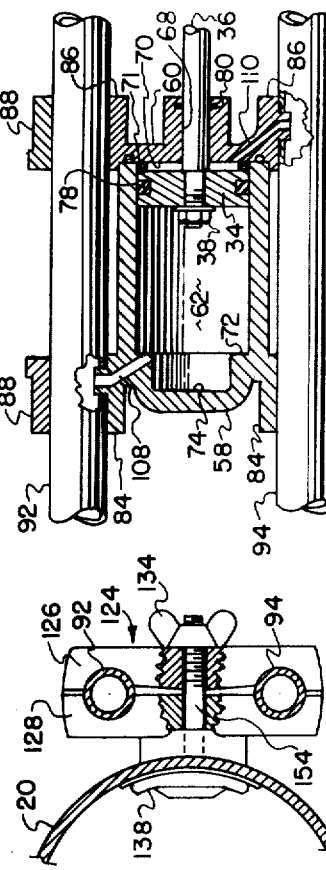
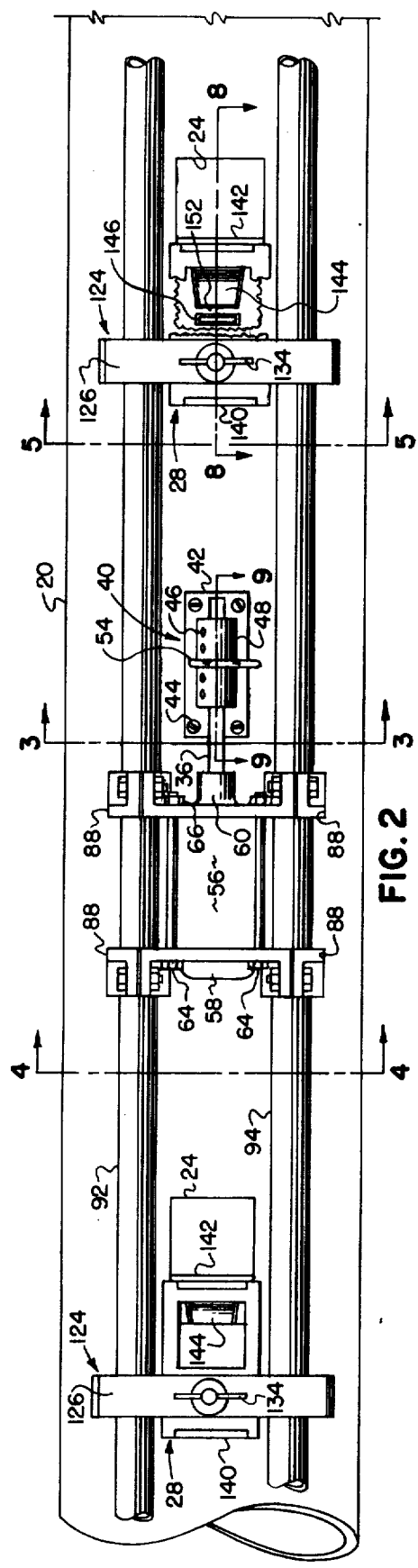
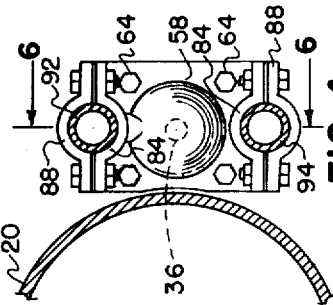
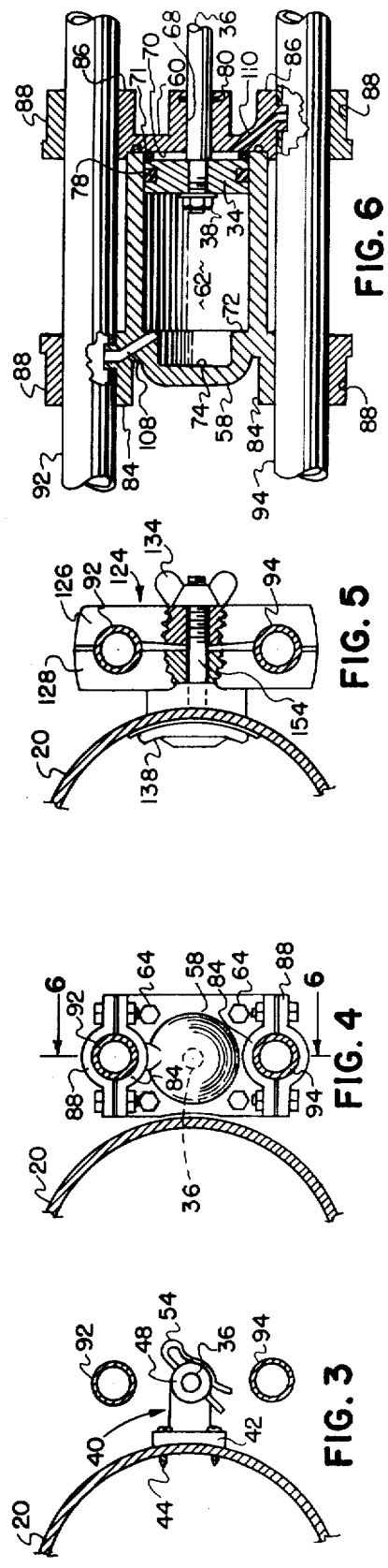

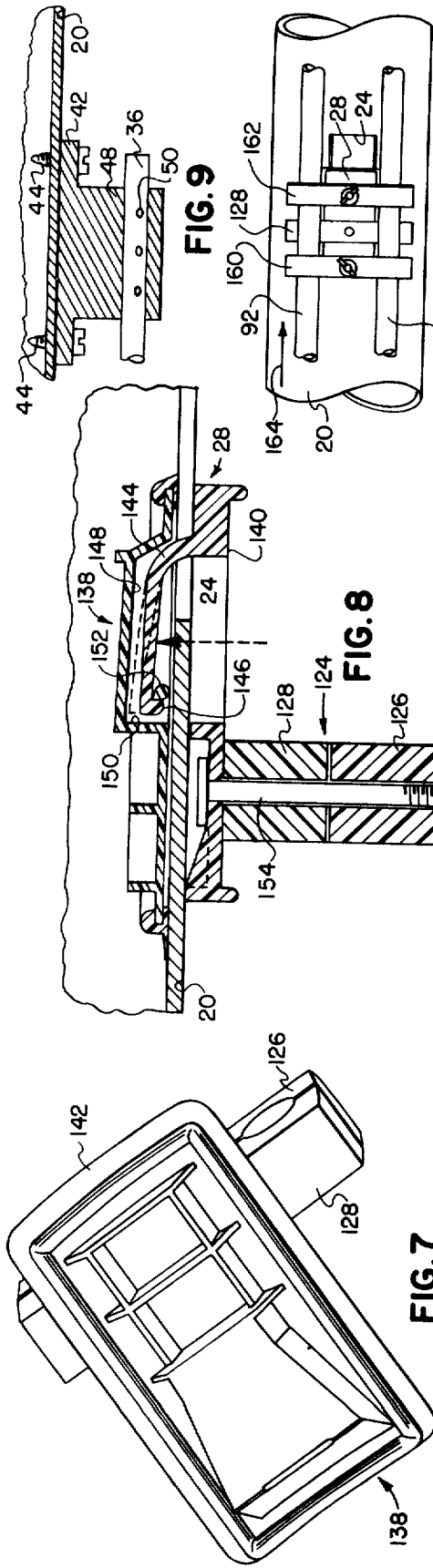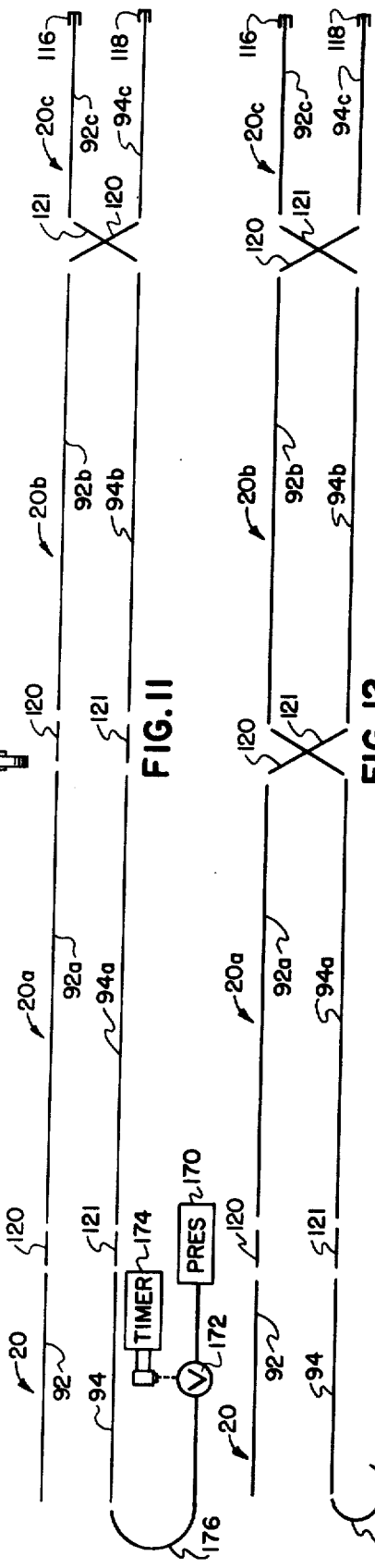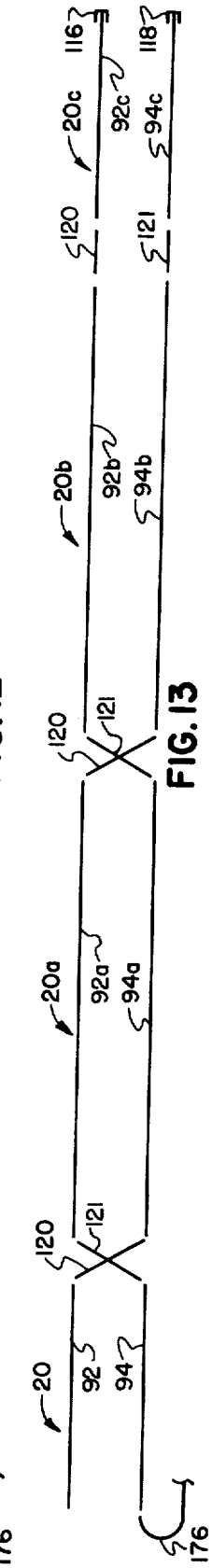

PNEUMATICALLY OPERATED GATED IRRIGATION SYSTEM

This invention relates to improvements in gated irrigation pipe and, more particularly, to a gated pipe irrigation system in which a selected series of gates are automatically opened or closed pneumatically.

The use of irrigation pipe having a series of longitudinally spaced orifices with associated gates controlling the discharge of water therefrom is known. Heretofore, it has been the practice to open or close the gates by hand. Manual actuation requires the physical presence of the farmer, resulting in inconvenience and a loss in manpower and time. It should be understood that pipe runs of one-half mile, for example, are common. As it is the usual practice to sequentially irrigate the farm land serviced by the irrigation line, only a relatively small number of gates are open at a given time. Accordingly, it is required that the farmer make a succession of trips to the field to open and close the gates in accordance with the irrigation plan that is employed.

Gated irrigation pipe is typically available in 30 ft. sections having various gate spacings to coincide with the row spacing used for the particular crop to be irrigated. The pipe sections are laid end to end in the field with their gates aligned with corresponding furrows. A one-half mile irrigation pipeline of this type would comprise 88 of such sections 30 ft. in length. Typically, the gates of a series of five of the 30 ft. pipe sections will be open at one time; therefore, one 150 ft. stretch of the total half-mile long pipeline would be discharging water at a given time. Approximately every 12 to 24 hours, depending upon conditions which may vary widely, the gates of the next 150 ft. stretch of pipe must be opened and the gates previously opened must be closed in order for the irrigation plan to progress. When the gates are manually operated as discussed above, this requires the presence of the farmer somewhere along the pipeline every time the gates are changed. It may be appreciated that in this example, which is presented for purposes of illustration only, approximately nine days are required to irrigate the field if the gates are changed every 12 hours.

To eliminate the inherent inconvenience of manual control, it has been proposed that the gates of each section of irrigation pipe be automatically controlled and tied together by a linkage so that all gates of a particular section would be operated simultaneously. However, in past operating systems, the gate linkage has been securely mounted to the irrigation pipe by fastening one end of this linkage to the associated irrigation pipe. The problem then presented is that the water pumped through the irrigation pipe is typically cool well water at a temperature on the order of 55° F. Since the pipe is exposed to the direct radiation of the sun, the temperature of the linkage and the pipe may reach 140° F. Accordingly, the cold well water when initially introduced into the pipe causes it to critically contract with no responsive movement of the linkage being available, due to the fixed mounting of the gate linkage at an end thereof. Thus, the non-contraction of the gate linkage holds the attached gates at a relatively stationary position which subjects each gate to forces produced by the contracting irrigation pipe bearing against each gate. These forces have in the past caused gate breakage, primarily those gates located at the end of each section of irrigation pipe.

It is, therefore, the primary object of the present invention to provide an automatic operating system for a gated irrigation pipe which is not subject to an expansion or contraction differential that will damage the gates, and which will assure positive operation of the gates in accordance with the irrigation plan.

As a corollary to the foregoing object, it is an important aim of this invention to provide such a system that is pneumatically operated and which opens or closes a series of gates associated with longitudinally spaced orifices along the length of the pipe from which the water discharges.

Another important object of this invention is to provide a system as aforesaid in which relatively small air conduits or pipes serve to both communicate a source of pneumatic pressure with an operating cylinder associated with the irrigation pipe, and function as an operating linkage to simultaneously open or close the gates when the cylinder is actuated.

Still another important object of the invention is to provide such a system in which the air conduits may be set up for the next change of the gates and such change effected pneumatically without the necessity of the farmer or operator being present.

More particularly, it is an object of this invention to provide a system as in the immediately preceding object, in which the gates of each pipe section of a series of end-to-end pipe sections are separately controlled but where the air lines thereof are in series with one another, and wherein the paths of pneumatic communication from the air lines of one pipe section to the next are selectable so as to cause either opening or closing of the gates as desired in accordance with the irrigation plan.

Furthermore, it is another important object of the present invention to provide a pneumatically operated gated irrigation pipe in which the degree to which the pipe orifices open in response to operation of the gates is adjustable to compensate for the downstream drop in the water pressure along the pipeline.

Still further, it is an important object of this invention to provide a gated pipe as in the immediately preceding object in which the gates within a given pipe section may be set to open to different degrees to compensate for pressure drop or particular soil conditions.

Yet another important object of the invention is to provide a gated irrigation pipe with automatic gate control, as aforesaid, in which the pneumatic operating system is economical to manufacture and may be added to existing manually controlled gated irrigation pipe to convert the same to automatic control.

Additionally, it is an important object of the invention to provice an automatic irrigation system as aforesaid in which inadvertent pressure buildup which could cause separation of the irrigation pipes at the joints thereof is precluded by providing means of assuring that opening of the next series of gates is effected prior to complete closure of the gates that were previously opened.

In the furtherance of the foregoing objects, the present invention employs an irrigation pipe having a number of longitudinally spaced gate-controlled orifices for discharge of irrigation water therefrom. The gates slide longitudinally and are attached to a pair of parallel air conduits in the form of relatively small diameter tubular plastic pipes extending along the length of the irrigation pipe externally thereof. A pneumatic piston and cylinder assembly is positioned on the exterior of the pipe midway between its ends, dividing the pipe into equal lengths to delimit the effects of the differences in expansion between the conduits and the irrigation pipe. The cylinder is secured to the air conduits and is free to shift in a longitudinally back and forth direction. The two air conduits communicate with the cylinder via ports at respective end walls of the cylinder to provide two-way action to either open or close the gates, the ports being sized to provide positive opening before closing.

Assuming that the gates of a selected irrigation pipe are in an initial closed position, air under pressure is introduced into one of the conduits to inject the pressurized air into the cylinder through the cylinder end wall which is adjacent the stationary piston head. The pressurized air seeking an increase in internal volume necessarily shifts the cylinder away from the stationary piston head to present the increased volume. This movement of the cylinder concurrently shifts the air conduits, now acting as operating rods, to thereby shift the coupled gates to an open position. Upon reaching a maximum volume, i.e., a maximum displacement between the cylinder end wall and the stationary piston head, the opposed cylinder end wall is now adjacent the stationary piston head. Therefore, to close the open gates, the other air cnduit is pressurized to cause reverse movement of the cylinder and concurrent shifting of the conduits or rods. Each gate may be made adjustable to present a selected orifice size when the cylinder has shifted to the gate-opening position.

A number of irrigation pipes are joined end to end in the usual manner to form the pipeline, and flexible hose couplings are employed to provide communication between the air conduits of adjacent pipes so that a single pressurized air source actuates a number of gated pipes provided with the present invention. By manually or mechanically presetting the flexible couplings for either in-line or cross-connection of the air conduits of adjacent pipes, the gates are opened and closed at predetermined intervals according to the irrigation plan. The air source is automatically controlled, such as by a timer and solenoid valve, to pressurize the air conduits at the end of each irrigation interval to thereby change the gate positions. Various other means to actuate the air source may be used such as radio, light and sound waves in order to alleviate the requirement that the operator be proximate to the air source.

Water flow direction tubes, commonly referred to as "socks," may be attached to the conduits by wire or clips at predetermined positions to control flow of water directly into the furrows.

BRIEF DESCRIPTION OF THE DRAWINGS

FIG. 1 is an elevational view of first and second serially connected irrigation pipes with the pipes foreshortened for the purposes of illustration, showing the pneumatic gate control system of the present invention with a cross-over pneumatic connection of the air conduits at the pipe joint.

FIG. 2 is an elevational view of the second irrigation pipe of FIG. 1, on an enlarged scale, showing the pneumatically operated gate control system mounted on the side of the pipe with the gates thereon at an open position.

FIG. 3 is a vertical sectional view, taken along line 3—3 in FIG. 2, showing the means of affixing the piston rod to the irrigation pipe in a displaced relationship therefrom.

FIG. 4 is a vertical sectional view, taken along line 4—4 in FIG. 2, showing the body section of the cylinder in elevation and the piston rod in phantom lines, as well as the means for seating the air conduits passing therethrough.

FIG. 5 is a vertical sectional view, taken along line 5–5 in FIG. 2, showing the first and second clamping halves coupling a gate to the air conduits.

FIG. 6 is a vertical sectional view, taken along line 6—6 in FIG. 4, showing the interior of the piston/cylinder combination and the two ports communicating the air conduits with opposed end walls of the cylinder.

FIG. 7 is a perspective view, on an enlarged scale, of the closure pad of a gate member as it would appear from the interior of an irrigation pipe, the pipe being removed from the illustration to show the clamping halves externally of the pipe.

FIG. 8 is a horizontal sectional view, taken along line 8—8 in FIG. 2, showing the manner of snap-tongue engagement between the clip member and closure pad of a selected gate and the relationship of the intervening irrigation pipe.

FIG. 9 is a sectional view taken along line 9—9 in FIG. 2, showing the structure used for mounting the piston rod to the pipe as well as the means therein for adjusting the effective stroke of the piston rod.

FIG. 10 is an elevational view of a lost-motion connector used in coupling a gate to the air conduits and shown at a point of travel prior to full closure of the associated pipe opening.

FIG. 11 is a diagrammatic view showing the first step of an irrigation system watering plan and the manner of pneumatic communication of the air conduits.

FIG. 12 is a diagrammatic view of the irrigation system shown in FIG. 11, showing the second step of the irrigation plan.

FIG. 13 is a diagrammatic view of the irrigation system shown in FIGS. 11 and 12, showing the third step of the irrigation plan.

DETAILED DESCRIPTION

Referring more particularly to the drawings, FIGS. 1 and 2 fragmentarily show two gated irrigation pipes 20 and 20' joined end to end by a coupler 21 and each equipped with a pneumatically operated control system generally designated 22. The pipe 20 has a plurality of longitudinally spaced, rectangular openings or orifices 24 for discharge of water therefrom into the furrows of a field (not shown). Each opening 24 is provided with a sliding gate 28 movable back and forth longitudinally of the pipe for controlling such flow. The gates 28 of pipe 20 are shown in their open positions where it may be appreciated that water discharge orifices are presented. A gate 28' is illustrated on the pipe 20' and is shown in its closed position sealing the associated opening.

Comprising a part of the gate control system 22 is a fluid operated actuator which includes a piston having a piston head 34 provided with a piston rod 36 attached thereto by means of a nut 38 engaging a threaded end of rod 36. The piston is secured to pipe 20 by means of a bracket 40 having a mounting plate 42 fastened to pipe 20 by means of sheet metal screws 44. Sleeve 48 extends from mounting plate 42 for receiving the end of piston rod 36 therein. One of a series of longitudinally spaced apertures 50 along rod 36 is placed in alignment with one of a series of cross openings 46 in sleeve 48 so as to receive a pin member 54 therethrough. Openings 46 extend at an angle that permits member 54 to be easily inserted and withdrawn. Accordingly, the piston is held in a horizontal position and displaced from the exterior surface of pipe 20.

Cylinder 56, preferably constructed from a plastic material or the like, comprises a body section 58 and a cap section 60. Upon placement of the piston head 34 within the cylindrical bore 62 of body section 58, the cap section 60 is mounted thereto by means of elongated screws 64 extending through the body and cap sections and receiving nuts 66 at the terminal ends thereof. A longitudinal bore 68 within cap section 60 allows for protrusion of piston rod 36. Upon joining of the body section 58 and cap section 60, a cylindrical region is presented therein having first and second end walls 70 and 72 with the stationary piston head 34 positioned therebetween. Adjacent the first end wall 70 is an annular rim 71 preventing abutment of piston head 34 on end wall 70. At the second wall 72 a reduced bore 74 extends therefrom to allow for projection of piston nut 38 therein and preclude interference with the operating stroke of the piston/cylinder combination.

A piston ring 78 provides a seal between the piston head 34 and the surrounding cylindrical wall. O-ring 80 lies about rod 36 in bore 68 to present a similar seal between the piston rod 36 and the longitudinal bore 68.

Body and cap sections 58 and 60 are preferably molded from a lightweight plastic material with opposed, upper and lower semicircular collars 84 integrally formed on body section 58 and like semicircular collars 86 formed on cap section 60. Four clamping elements 88 each provided with a semicircular collar are bolted to the body and cap sections 58 and 60 and cooperate with semicircular collars 84 and 86 to present split collars that clamp a pair of parallel, longitudinally extending air conduits 92 and 94 therein. Accordingly, the cylinder 56 is mounted between the conduits 92 and 94 and connected securely thereto.

As is clear in FIG. 6, the conduit 92 has a hole in its side wall that receives a nipple projecting from a port 108 in the end of body section 58 which communicates with the cylinder bore 62 through the left end wall 72. Similarly, conduit 94 has a hole in its side wall receiving a nipple projecting from a port 110 in the end cap 60 which communicates with the cylindrical bore 62 through right end wall 70. As shown, O-ring seals are employed to prevent leakage. It should be noted that the port 110 is a channel of smaller cross-section than the port 108 so that, as will be discussed hereinafter, it is assured that the action of the cylinder 56 in closing the gates of the irrigation pipe will be slower than the action of the cylinder in opening such gates.

The end caps 116 and 118 on conduits 92 and 94 shown in FIG. 1 are used only on the terminal end of each conduit associated with the last pipe in the irrigation pipeline. In such multi-pipe systems using a plurality of pipes 20, 20', etc., the adjacent ends of conduits 92 and 94 at the pipe joints are placed in communication by flexible hose couplings 120 and 121 as illustrated in FIG. 1. Quick release fittings 122 on the ends of the flexible hoses and conduits are used to facilitate rapid connection of the couplings 120 and 121 either in-line or in a cross-connected manner as illustrated.

Air conduits 92 and 94 also function as operating rods and as such are operably coupled to the plurality of gates 28 longitudinally spaced along pipe 20 in correspondence with openings 24. At each gate 28, a clamping block 124 comprising first and second clamping halves 126 and 128 is configured to receive air conduits 92 and 94 sandwiched therebetween and is held by a wing nut 134. Each gate 28 is slidable along the pipe 20 and has an inner closure member formed by a closure pad 138 and an outer closure or clip member 140 which is normally manually operated by the farmer to slide the closure pad 138 into and out of an aligned position with the corresponding pipe opening 24. The closure pad 138, as shown in FIG. 7, has a sealing gasket 142 therearound and is adapted to slide along the interior surface of the pipe 20 into alignment with opening 24. Outer clip member 140 is adapted to slide along the exterior of the pipe 20 and has a snap-action tongue 144 with a dog 146 extending therefrom. Closure pad 138 has a recess 148 in the outer face thereof receiving tongue 144 therein. Spaced from an end wall 150 of recess 148 is a bar 152 which presents an open socket between wall 150 and bar 152 into which the dog 146 snaps, as shown in FIG. 8, so as to fasten closure pad 138 to clip member 140 with the wall of pipe 20 sandwiched therebetween. Clamping block half 128, as above described, is secured to outer closure member 140 by a tee-bolt 154. Therefore, with clamping block half 126 secured thereto by threading wing nut 134 on bolt 154, the gate 28 is operably coupled with the air conduits 92 and 94.

Each air conduit 92 and 94 is preferably a length of PVC plastic pipe, typically one-half inch in diameter. Irrigation pipe is commonly either PVC plastic or aluminum. As mentioned earlier in this specification, irrigation pipe is commercially available in 30 ft. lengths, and the pipes are joined end to end as illustrated in FIG. 1 to form a pipeline of the necessary length. Though fragmentarily shown, each of the pipes 20 and 20' in FIG. 1 represents a typical 30 ft. pipe section. With reference to pipe 20, it should be understood that the piston rod 36 is secured to the pipe by the sleeve 48 and pin member 54 approximately midway between the ends of the pipe. Accordingly, the length of the air conduits 92 and 94 in each longitudinal direction from the actuating cylinder 56 will be approximately 14 ft. when it is considered that the conduits need not extend completely to the ends of the pipe 20 but only a sufficient distance to enable them to be coupled to the endmost gates 28.

The constructional features just discussed above minimize the expansion and contraction of the operating linkage comprising the air conduits 92 and 94 that will occur under field conditions. Besides the composition and tubular configuration of the air conduits, their length from the actuating cylinder 56 is minimized by the central connection of the cylinder 56 thereto. This is important since only half of the total length of the air conduits 92 and 94 along a given pipe section will be subject to proportional expansion and contraction, i.e., the expansion or contraction will be proportional to the distance away from the approximate longitudinal center of the conduits where the cylinder 56 is secured thereto. In practice, it has been found that the maximum expansion/contraction differential between the air conduits and the irrigation pipe at the ends thereof is sufficiently small to preclude breakage of the gates 28.

OPERATION

For purposes of explanation the functioning of a single irrigation pipe 20 will be initially described.

Upon installing system 22 on pipe 20, cylinder 56 is shifted so that piston head 34 is adjacent cylinder end wall 72. Gates 28 are placed in a closed position and are then coupled to air conduits 92 and 94 by means of clamping blocks 124 as above described. An external pressurized air source 170, as diagrammatically shown in FIG. 11, is connected to the left end of air conduit 92. The left end of conduit 94 remains vented to atmosphere. Upon pressurization of conduit 92 with suitable end caps 116 and 118 in place, the pressurized air is injected into cylinder 56 through end wall 72 via port 108 and against the adjacent piston head 34. The cylinder 56 shifts to the left to a point at which the opposed, right end wall 70 is now adjacent the piston head 34, as shown in FIG. 6. This provides concurrent movement of air conduits 92 and 94 and operably coupled gates 28 and thus shifts the gates 28 to the open position shown in FIG. 2. To subsequently close the now open gates 28, air conduit 92 is vented and conduit 94 is pressurized to inject air via port 110 into the opposite end of cylinder 56 through end wall 70. Cylinder 56 responds as above described but in a reverse direction with concurrent shifting of the air conduits 92 and 94 and operably coupled gates 28 to a closed position.

The effective stroke of cylinder 56, in relation to the water discharge openings 24, can be adjusted by withdrawing pin member 54 from the aligned rod aperture 50 for alignment with another opening/aperture pair 46, 50. Such adjustment will shift the limits of the fixed stroke longitudinally along pipe 20 so a greater or lesser portion of each opening 24 will be exposed when the gates 28 are open. With such an adjustment the degree of opening of the plurality of pipe openings or orifices 24 can be preset in order to compensate for the loss of water pressure head that occurs in irrigation pipes downstream from the water source.

A second adjustment is provided in which the degree of opening presented by individual gates in a pipe section can be selected. As shown in FIG. 10, first and second clamping blocks 160 and 162 have been mounted to either side of the clamping block half 128, the outer clamp half 126 having been removed so that the gate 28 illustrated in FIG. 10 is not directly coupled to the conduits 92 and 94. Clamping blocks 160 and 162 are determinately spaced from the clamping half 128 so as to present a loss motion connector between conduits 92 and 94 and gate 28 so that shifting of the conduits 92 and 94 moves the gate 28 less than the normal concurrent shifting movement as above described. The adjustable connector in FIG. 10 is shown midway through the initial lag in actuation of gate 28 upon closing movment of the linkage to the right as illustrated by the arrow 164; continued movement will bring block 160 into engagement with clamp half 128 and the partially open gate 28 will then slide to the right to close opening 24.

FIGS. 11, 12 and 13 diagrammatically show the steps of an irrigation plan in which a series of irrigation pipes 20, 20a, 20b and 20c with the apparatus of the present invention installed thereon are employed. Water flow is from left to right as viewed in the drawings. The irrigation pipe 20 is illustrated by a pair of parallel horizontal lines 92 and 94 representing the air conduits which are coupled with its gates; the other pipes are similarly denoted with the use of the "a", "b" and "c" notation. End caps 116 and 118 are installed on the right ends of air conduits 92c and 94c of pipe 20c at the downstream end of the pipeline. It is to be understood that each of the four pipes 20, 20a, 20b and 20c represents an operating unit of the irrigation system, and that four such single pipe units are illustrated herein for simplicity. In practice, an operating unit would typically be a stretch of irrigation pipe comprising five end-to-end pipe sections as discussed above or, more generally, from two to ten pipe sections. In such a multi-pipe operating unit, the hose couplings 120 and 121 of the present invention would all be connected in line at the pipe joints within the operating unit so that pressurization of the line 92 of a pipe section at one end of the unit would result in pressurization of all of the conduits 92 of the entire unit. The same would be true of all of the conduits 94 within such operating unit. However, for purposes of illustration herein, a single pipe operating unit is illustrated in FIGS. 11–13 to facilitate the operational description.

When air conduit 94 of a given irrigation pipe is pressurized, the gates of that pipe close. Similarly, pressurization of conduit 92 causes the gates to open. In the irrigation plan illustrated in FIGS. 11–13 the furrows (not shown) lying transverse to each pipe are to be sequentially irrigated beginning with pipe 20c and ending with pipe 20. As diagrammatically illustrated, in-line pneumatic communication has been established between all of the pipes except 20b and 20c where the couplings 120 and 121 are cross-connected. This is the initial setup of the irrigation system.

A source of air under pressure is illustrated at 170 controlled by a solenoid valve 172 operated by a timer 174. An air hose 176 extends from the solenoid valve 172 and is connected to the left end of air conduit 94, which is at the upstream end of pipe 20. Conduit 92 is vented to atmosphere and no connection is made thereto.

The timer 174 energizes the solenoid valve 172 at predetermined intervals, such as every 12 hours. Valve 172 remains open for one to two minutes to give adequate time for the gates to complete their changeover. The valve 172 is then deenergized to close the air line, and is not energized again until the end of the 12-hour interval. Accordingly, heavy demand is not made on the pressure source 170 so that a tank of air under pressure or bottled gas may be used for the source.

Initial pressurization of conduit 94 as illustrated in FIG. 11 assures that all gates are in their proper positions for the first watering interval. The only gates that are open are those of pipe 20c due to pressurization of air conduit 92c by the cross-connected coupling 121. The connection of conduit 94c to conduit 92b by the cross-connection of coupling 120 vents the associated cylinder 56 at port 110 so that the piston thereof is responsive to the injection of pressurized air into the cylinder via port 108. It should also be understood at this juncture that the use of flexible couplings 120 and 121 of sufficient length to provide a degree of slack permits the air conduits to shift under the action of the cylinders without any binding or interference, since the slack allows for the opposite displacement of the conduits of adjacent pipes.

At any time during the first watering interval, the farmer or operator may go to the field and set the system up for the next change of the gates. This is shown in FIG. 12 where it may be seen that there is now a cross-connection between pipes 20a and 20b. The presence of the operator at the pipeline at the time the change is made at the end of the watering interval is not required. When the timer 174 again energizes solenoid valve 172, the various air cylinders respond to the changed conditions and the gates of pipe 20b open while the gates of pipe 20c close. It is now pointed out that port 108 preferably communicates with cylinder 56 through end wall 72. Such communication offers a greater possible volume within cylinder 56, due to the absence of rod 36, than that volume of the cylinder 56 offered to port 110. This greater volume assures that the gates of pipe 20b will open before the gates of pipe 20c close. Also, it is further pointed out that the relatively small size of port 110 as compared with port 108 offers extra assurance that the gates of pipe 20b will be open before the gates of pipe 20c close. These assurances avoid a situation in which all gates are in a closed position which could cause separation at the joints of the serially connected pipes due to the buildup of water pressure therein.

Again, at any time during the watering interval, the next change is set up as illustrated in FIG. 13. It may now be seen that, except for the initial and the final steps, the operator merely cross-connects the couplings 120 and 121 at each end of the next pipe or series of pipes whose gates are to be opened.

The final step is not shown in the drawings. The operator changes the couplings 120 and 121 between pipes 20a and 20b to in-line, and connects hose 176 to the left end of conduit 92 of pipe 20, leaving conduit 94 vented to atmosphere.

Although the preferred means of making the in-line and cross-connections at the pipe joints is through the use of the flexible hose couplings 120 and 121 due to simplicity and economy, it should be understood that a four-way valve could also be employed for the same purpose, with flexible connections between the valve and the four adjacent ends of the air conduits. Such valves could be solenoid operated if desired and several could be employed along a pipeline so that several changes could be made by the appropriate energization of control lines to the valves from a remote location. After several changes, the valves would be disconnected and replaced with the hose couplings as shown, and installed at pipe joints later in the sequential irrigation plan. It may be appreciated that in such an arrangement the pipeline could remain unattended for several days at a time.

Furthermore, in special applications the timer 174 could be replaced by a float switch in a furrow so the changeover is effected in response to a predetermined water level. Also, the valve 172 could be controlled from a remote location and operated at desired intervals in response to remotely generated commands of various types, such as radio signals, light, sound, etc.

It should be appreciated that rapid contraction of the irrigation pipe when water is first pumped therein will not cause breakage of the gates as has been experienced in previous systems, discussed at the outset of this specification. Assuming that the gates are closed, the piston head 34 will be against the left end wall 72, opposite to the position thereof shown in FIG. 6. Accordingly, the pneumatic piston and cylinder assembly will at this time provide no resistance to the movement of the cylinder 56 to the left as viewed in FIGS. 1, 2 and 6.

If an initially very warm irrigation pipe 20 and the linkage of the present invention are assumed, the introduction of cool well water into the irrigation pipe may cause rapid and significant contraction thereof which has the effect of shortening the irrigation pipe, thereby causing the ends thereof to displace toward the center. It should be noted in FIGS. 1 and 2 that each of the gates 28 is of like orientation in that the tongue 144 thereof projects to the left from the right edge of the clip member 140, and inwardly through the wall of the irrigation pipe 20 as illustrated in FIG. 8. Accordingly, contraction of the stretch of pipe 20 to the right of center as viewed in FIGS. 1 and 2 could cause the right edge of one or more of the openings 24 to bear against the inwardly protruding base portion of the tongue 144 of the associated gate, which could cause breakage of the gate in the absence of the present invention. However, in the present invention the linkage is free to shift to the left since the cylinder 56 is not pressurized. To the left of the longitudinal center of the pipe 20, contraction of the pipe relative to the gates and linkage merely causes some relative movement of those gates with respect to their associated openings 24, and adequate compensation is provided by the peripheral seal gasket 142 of each gate 28 which sufficiently overlaps the boundaries of the associated openings 24 to prevent leakage through such openings.

Having thus described the invention, what is claimed as new and desired to be secured by Letters Patent is:

1. In an irrigation system utilizing an irrigation pipe having longitudinally spaced openings therein from which water may be discharged, and a plurality of gates associated with respective openings and each movable between an open position in which water is permitted to discharge from the associated opening and a closed position sealing the opening, the improvement comprising:

a fluid-operated actuator having a cylinder component provided with a piston component therein;

means securing one of said components to said pipe, whereby the other component moves relative to the pipe in response to fluid pressure in said cylinder component;

a longitudinally shiftable operating member extending along said pipe, provided with means for operably coupling the same with said gates, and having a passage therein communicating with said cylinder component for flow of fluid along the member to the cylinder component;

means connecting said other component to said member for movement of the member with the other component to operate the gates; and means coupled with said member for delivering fluid under pressure to said passage for flow to said cylinder component, whereby to shift the member to open or close the gates.

2. The improvement as claimed in claim 1, wherein said member is a tubular conduit presenting said passage extending longitudinally thereof.

3. The improvement as claimed in claim 2, wherein said member has a pair of opposed ends, said connecting means securing said other component to said member approximately midway between the ends thereof.

4. The improvement as claimed in claim 2, wherein said one component is said piston component and said other component is said cylinder component.

5. The improvement as claimed in claim 1, wherein said one component is said piston component and said other component is said cylinder component, each of said gates being slidable longitudinally of said pipe between the open and closed positions thereof, and wherein said cylinder component has a predetermined stroke and said securing means includes structure for attaching said piston component to said pipe at any one of a plurality of longitudinally displaced locations to control the size of the water-discharging openings presented when the gates are moved to their open positions.

6. The improvement as claimed in claim 1, wherein said other component has a predetermined stroke upon delivery of said fluid under pressure to said cylinder component, and wherein said means for operably coupling said member with the gates includes a lost-motion connection between said member and at least one of said gates for reducing the movement of said one gate to a displacement less than said stroke in response to operation of said actuator.

7. In an irrigation system utilizing an irrigation pipe having longitudinally spaced openings therein from which water may be discharged, and a plurality of gates associated with respective openings and each movable between an open position in which water is permitted to discharge from the associative opening and a closed position sealing the opening, the improvement comprising:
   a fluid-operated actuator having a cylinder component provided with a piston component therein;
   means securing one of said components to said pipe, whereby the other component moves relative to the pipe in response to fluid pressure in said cylinder component;
   first and second longitudinally shiftable operating members extending along the pipe substantially the length thereof and provided with means for operably coupling the same with said gates, and each having a passage therein communicating with said cylinder component for flow of fluid along said first member to the cylinder component to cause the gates to open, and along said second member to the cylinder component to cause the gates to close;
   means connecting said other component to said members for movement of the members with the other component to operates the gates; and
   means for delivering fluid under pressure to either of said passages for flow to said cylinder component, whereby to shift the members to open or close the gates.

8. The improvement as claimed in claim 7, wherein said members are tubular conduits presenting said passages extending longitudinally thereof.

9. The improvement as claimed in claim 8, wherein said members have opposed ends, said connecting means securing said other component to said members approximately midway between the ends thereof.

10. The improvement as claimed in claim 8, wherein said one component is said piston component and said other component is said cylinder component.

11. The improvement as claimed in claim 7, wherein said one component is said piston component and said other component is said cylinder component, and wherein said members extend in substantial parallelism and said connecting means mounts said cylinder component between said members and secures the same thereto.

12. The improvement as claimed in claim 7, wherein said one component is said piston component and said other component is said cylinder component, each of said gates being slidable longitudinally of said pipe between the open and closed positions thereof, and wherein said cylinder component has a predetermined stroke and said securing means is operable to attach said piston component to said pipe at any one of a plurality of longitudinally displaced locations to control the size of the water-discharging openings presented when the gates are moved to their open positions.

13. The improvement as claimed in claim 12, wherein said piston component has a piston rod, and said securing means includes an arm projecting outwardly from said pipe and provided with means receiving said piston rod for holding said rod in a generally horizontal position displaced from said pipe and extending longitudinally thereof.

14. The improvement as claimed in claim 13, wherein said receiving means comprises a sleeve receiving said piston rod and adjustable means engaging said sleeve and said rod for fastening the rod to the sleeve with the rod extending therein to a degree corresponding to the selected longitudinally displaced location of the piston component.

15. The improvement as claimed in claim 7, wherein said members extend in substantial parallelism and said operably coupling means comprises a plurality of clamping blocks with each block fastened to a corresponding gate, each of said blocks spanning the parallel members at the corresponding gate and being in clamping engagement with said members.

16. The improvement as claimed in claim 7, wherein said actuator is pneumatically operated and said fluid delivering means delivers gas under pressure upon operation thereof to open or close the gates.

17. The improvement as claimed in claim 7, wherein said other component is movable relative to said pipe in the absence of pressurization of said cylinder component and in response to the force of engagement of an edge of any of said openings with the associated gate caused by a change in the length of said pipe due to expansion or contraction thereof, whereby such gate is allowed to shift under said force to prevent damage thereto.

18. In an irrigation system:
   a series of irrigation pipes joined end to end, each pipe having longitudinally spaced openings therein from which water may be discharged and control gates associated with respective openings, each gate being movable between an open position in which water is permitted to discharge from the associated opening and a closed position sealing the opening,
   each of said pipes being provided with
      (1) a fluid-operated gate actuator having a cylinder component with a piston component therein,
      (2) means securing one of said components to the pipe, whereby the other component moves relative to the pipe in response to fluid pressure in said cylinder component,
      (3) first and second longitudinally shiftable operating members extending along the pipe substantially the length thereof and provided with means for operably coupling the same with said gates, and each having a pair of opposed ends and further having a longitudinal passage therein communicating with said cylinder component for flow of fluid along said first member to the cylinder component to cause the gates to open, and along said second member to the cylinder component to cause the gates to close, and
      (4) means connecting said other component to said members for movement of the members with the other component to operate the gates,
   a pair of flexible lines for interconnecting the adjacent ends of said members at each of said pipe joints respectively,
   selectively operable means enabling each pair of lines to be connected to corresponding ends of the members to communicate the passages of the members of adjacent pipes in in-line relationship, or to cross-connect the members to communicate the passages of the first and second members of adjacent pipes, and means for delivering fluid under pressure to either of the members of one of said pipes for flow to said cylinder components of the actuators in accordance with a flow path established by the pairs of connecting lines, whereby to shift the members associated with selected pipes to open or close the gates thereof.

19. The system as claimed in claim 18, wherein said fluid delivery means includes means for automatically pressurizing one of the members of said one pipe at predetermined watering intervals.

20. The system as claimed in claim 18, wherein the cylinder component of each of said actuators has means for reducing the rate at which said other component of the actuator moves in response to fluid pressure in said second member of the associated pipe relative to the rate of movement thereof in response to fluid pressure in said first member, whereby the gates of a pipe open before the gates of another pipe close.

21. The invention as claimed in claim 7 or 18, wherein said members are tubular conduits of plastic material presenting said passages extending longitudinally thereof.

* * * * *